US008155243B2

(12) United States Patent
Miscopein et al.

(10) Patent No.: US 8,155,243 B2
(45) Date of Patent: Apr. 10, 2012

(54) METHOD FOR THE DETECTION OF SYMBOLS AND ASSOCIATED RECEIVER

(75) Inventors: Benoît Miscopein, Grenoble (FR); Jean Schwoerer, Grenoble (FR)

(73) Assignee: France Telecom, Paris (FR)

( * ) Notice: Subject to any disclaimer, the term of this patent is extended or adjusted under 35 U.S.C. 154(b) by 925 days.

(21) Appl. No.: 12/087,524

(22) PCT Filed: Jan. 9, 2007

(86) PCT No.: PCT/FR2007/000033

§ 371 (c)(1),
(2), (4) Date: Jul. 9, 2008

(87) PCT Pub. No.: WO2007/080311

PCT Pub. Date: Jul. 19, 2007

(65) Prior Publication Data

US 2009/0067552 A1    Mar. 12, 2009

(30) Foreign Application Priority Data

Jan. 10, 2006    (FR) ...................................... 06 00195

(51) Int. Cl.
*H04L 27/06* (2006.01)
(52) U.S. Cl. .......................... 375/340; 375/316; 375/346
(58) Field of Classification Search .................. 375/130, 375/140, 142, 147, 346, 316, 317, 340
See application file for complete search history.

(56) References Cited

U.S. PATENT DOCUMENTS 6,965,630 B1 * 11/2005 Miller et al. .................. 375/130
2001/0048382 A1 * 12/2001 Low et al. ..................... 341/157
2004/0185787 A1 * 9/2004 Molisch et al. ............ 455/67.11

OTHER PUBLICATIONS

Moe Z. Win et al.: "Impulse Radio: How It Works", IEEE Communications Letters, IEEE Service Center, Piscataway, NJ, US, vol. 2, No. 2, Feb. 1998, XP011010556 ISSN: 1089-7798, p. 36-37.
Yi-Ling Chao et al.: "Weighted correlation receivers for ultra-wideband transmitted reference systems"; Global Telecommunications Conference, 2004. Globecom'04. IEEE Dallas, TX USA, Nov. 29-Dec. 3, 2004, Piscataway, NJ, USA, IEEE, vol. 1, Nov. 29, 2004, pp. 66-70, XPO 10758855 ISBN: 0-7803-8794-5; p. 66-p. 68.
Gunvenc, Sahinoglu: "Theshold-Based TOA Estimation for Impulse radio UWB Systems"; Mitshubishi Electric Research Laboratories, [Online] Dec. 2005, pp. 1-6, XP0O2394950 Internet: URL:http://www.merl.com/papers/docs/TR2005-O26.pdf>[extrait le Aug. 16, 2006] p. 1-3.

* cited by examiner

*Primary Examiner* — Shuwang Liu
*Assistant Examiner* — David Huang
(74) *Attorney, Agent, or Firm* — McKenna Long & Aldridge LLP

(57) ABSTRACT

Method for the detection of symbols by a receiver, each symbol ($S_0$, $S_1$) being transmitted from a transmitter in the form of a succession of pulses ($3a, 3b, \ldots, 3n; 4a, 4b, \ldots, 4n$) representing a predetermined sequence of numerical values, the numerical values having respective nominal weights within each predetermined sequence. According to this method, a succession of pulses corresponding substantially to a symbol ($S_0$, $S_1$) transmitted from the transmitter is received at the receiver. A sequence of numerical values ($S_r$) corresponding to the said received succession of pulses is determined, the said numerical values having respective weights within the determined sequence. The received symbol is chosen as a function of the determined sequence of numerical values, the choice comprising a weighting of the numerical values of the determined sequence, chosen to re-establish the respective nominal weights of the said numerical values.

12 Claims, 2 Drawing Sheets

METHOD FOR THE DETECTION OF SYMBOLS AND ASSOCIATED RECEIVER

This application claims priority from PCT/FR2007/000033 filed Jan. 9, 2007, which claims priority from French Application FR 06 00195, filed Jan. 10, 2006, both of which are hereby incorporated by reference in their entirety.

BACKGROUND OF THE INVENTION

The present invention relates to the detection of symbols by a receiver.

It relates, more particularly, to the detection of symbols transmitted by a transmitter in the form of a succession of pulses.

The detection of a pulse within a noisy signal has always been problematic and was already an issue in the field of radar systems.

In this respect, the CFAR (Constant False Alarm Rate) detector may be mentioned. It consists in determining the maximum number of triggers on noise peaks (false alarms) that the system can tolerate while still meeting the expected performance criteria. While only the noise is present, the receiver executes a calibration phase during which it determines, by dichotomy, the threshold corresponding to this maximum number of false alarms. The threshold value thus obtained corresponds to the best possible sensitivity of detection for a fixed error rate.

The CFAR detector method yields useful results, but it suffers from certain drawbacks directly associated with its principle of operation.

First of all, it exhibits a minimum error rate. Indeed, the receiver positions its threshold in order to obtain the requested number of false alarms, hence of errors, whatever the link conditions. As a result, the receiver is incapable of exploiting very good conditions, a fact which limits its performance. Secondly, the false alarms represent the vast majority of the errors. This imbalance must be compensated by an error correcting coding system. Lastly, the calibration of the threshold can be complex. It may for example be necessary to disconnect the antenna from the receiver in order to ensure the absence of any signal during its calibration. The calibration of the threshold can therefore only be carried out infrequently and outside of any communication phase.

Another known method for detecting pulses consists in looking for a fixed number of triggers on the useful signal. This particularly simple method relies on the knowledge of the number of pulses transmitted per interval of time. The detection threshold is firstly fixed at a high value, then it is lowered by a given value at each iteration, until it allows the expected number of pulses to be detected. Thus, if a transmitted signal comprises eight pulses per symbol-time, the goal of the system will be to obtain eight triggers per symbol-time.

This method is relatively inefficient owing to the fact that the number of pulses per interval of time is not always known in advance by the receiver and may also vary as a function of the link conditions and of the radio channel (number of echoes for example).

Furthermore, the problem of the detection of pulses also arises in systems using the recent UWB (Ultra-Wide-Band) radio technology.

This emerging technology does not use a continuous carrier frequency. Instead of modulating a carrier signal, the information to be transmitted is transmitted directly using pulses of very short duration (between a few hundreds of picoseconds and a few nanoseconds) and hence of very large bandwidth (several GHz). Since the energy—relatively low—of these pulses is spread out over this whole band, the spectral energy density of the signal is very low.

Thus, a UWB pulse signal is not a continuous signal, but a series of very short pulses with a very low duty cycle.

Multiple access is frequently achieved using time hops (Time Hopping) controlled by a pseudo-random sequence. The information can be modulated by varying the amplitude, the shape or even the delay of the pulses. As regards the hopping sequence, this constitutes a characteristic, or "signature", of the transmitter.

Each pulse must subsequently be detected by the receiver, which may be carried out either by a synchronous detection (coherent or by correlation), or by a quadratic detection. But, in any case, the result of the detection must then be examined in order to decide, depending on the amplitude of the signal or on the correlation level obtained, on the absence or on the presence of a pulse.

The detection of a succession of pulses can then allow the value of a corresponding received symbol to be decided.

The first UWB receivers used relied on a principle for detecting the pulses by synchronous correlation. In these receivers, it is the correlation level obtained that is compared with a threshold level in order to make a decision. Owing to the synchronous nature of these receivers, the correct adjustment of the threshold is, relatively speaking, not too critical in this case. In contrast, the detection of the pulses is much more problematic in the case of the new non-coherent receivers, based on the detection of energy or of amplitude.

When the pulse detection performance is very poor, it cannot then be hoped to detect efficiently one or more symbols transmitted in the form of a succession of such pulses.

For example, when it is desired to detect the presence or the absence of a pulse within a given interval of time, by comparison of the energy or amplitude measured over this interval of time with a detection threshold, the performances of the detection and of the consequent decision making on the value of the transmitted symbol largely depends on the positioning of this threshold. However, an appropriate value for this threshold is not necessarily readily chosen, especially as the optimum value may vary as a function of the radio conditions in particular.

One object of the present invention is to obtain an efficient symbol detection.

Another object of the invention is to obtain an efficient symbol detection, even when the detection of the successive pulses forming these symbols is relatively inefficient. In particular, the symbol detection should be efficient even when the detection threshold used for detecting the pulses is temporarily or more permanently maladapted.

Another object of the invention is to allow symbol detection in a system of the UWB type and, more particularly, by means of a non-coherent receiver.

SUMMARY OF THE INVENTION

The invention thus provides a method for detection of symbols by a receiver, each symbol being transmitted from a transmitter in the form of a succession of pulses representing a predetermined sequence of digital values, the digital values having respective nominal weights within each predetermined sequence. The method comprises the following steps:

receive, at the receiver, a succession of pulses substantially corresponding to a symbol transmitted from the transmitter;

determine a sequence of digital values corresponding to said received succession of pulses, said digital values having respective weights within the determined sequence; and decide on the symbol received as a function of the determined sequence of digital values, the decision comprising a weighting of the digital values of the sequence determined, chosen so as to restore the respective nominal weights of said digital values.

Thus, the decision on the transmitted symbol is made on the basis of the digital sequence determined at the receiver. Within this sequence, the digital values can have different weights, in other words be represented in different proportions, with respect to the same digital values within the symbols able to be transmitted. The above-mentioned weighting therefore allows the nominal weights of these digital values to be restored within the framework of the decision on the transmitted symbol.

The decision made is thus improved, since the digital values over-represented within the sequence determined, certain of which necessarily correspond to errors, are penalized, whereas the under-represented, and hence more reliable, digital values are favored when the decision is made.

The digital values in question can for example be binary elements, each transmitted by means of a pulse in the succession of pulses.

Advantageously, the succession of pulses substantially corresponding to a symbol transmitted from the transmitter is transmitted according to a pseudo-random sequence of time hops, which corresponds to the technique referred to as "Time Hopping".

Furthermore, the succession of pulses can be modulated by time shifting of the pulses (PPM modulation) or by enabling or disabling the transmission of the pulses (OOK modulation) for example.

Advantageously, the transmitter and the receiver use an ultra-wide-band radio communications technology of the UWB type.

The receiver can use synchronous detection or, as an alternative, it may be a non-coherent receiver. In this latter case, the determination of the sequence of digital values corresponding to said received succession of pulses can advantageously comprise a comparison of the energy of each pulse in the received succession of pulses with at least one given threshold.

The invention also provides a receiver designed for detecting symbols, each symbol being transmitted from a transmitter in the form of a succession of pulses representing a predetermined sequence of digital values, the digital values having respective nominal weights within each predetermined sequence. The receiver comprises:

means for receiving a succession of pulses substantially corresponding to a symbol transmitted from the transmitter;

means for determining a sequence of digital values corresponding to said received succession of pulses, said digital values having respective weights within the sequence determined; and means for deciding on the symbol received as a function of the determined sequence of digital values, said means for deciding on the symbol received comprising means for weighting of the digital values of the sequence determined, so as to restore the respective nominal weights of said digital values.

The invention also provides a computer program product comprising code instructions for implementing the above-mentioned method, when it is loaded and executed by computer processing means in a receiver.

The invention also provides a device for detection of symbols, each symbol being transmitted from a transmitter in the form of a succession of pulses representing a predetermined sequence of digital values, the digital values having respective nominal weights within each predetermined sequence. The detection device comprises:

means for obtaining a succession of pulses substantially corresponding to a symbol transmitted from the transmitter;

means for determining a sequence of digital values corresponding to said received succession of pulses, said digital values having respective weights within the determined sequence; and means for deciding on the symbol received as a function of the determined sequence of digital values, said means for deciding on the symbol received comprising means for weighting of the digital values of the determined sequence, so as to restore the respective nominal weights of said digital values.

The invention also provides a programmable component for detecting symbols, each symbol being transmitted from a transmitter in the form of a succession of pulses representing a predetermined sequence of digital values, the digital values having respective nominal weights within each predetermined sequence. The programmable component comprises:

means for obtaining a succession of pulses substantially corresponding to a symbol transmitted from the transmitter;

means for determining a sequence of digital values corresponding to said received succession of pulses, said digital values having respective weights within the determined sequence; and means for deciding on the symbol received as a function of the determined sequence of digital values, said means for deciding on the symbol received comprising means for weighting of the digital values of the determined sequence, so as to restore the respective nominal weights of said digital values.

DESCRIPTION OF PREFERRED EMBODIMENTS

The invention will be described hereinafter in its application to a UWB system. It is not however restricted to such an application and the invention may also be implemented in any other type of system comprising a receiver designed to receive, from a corresponding transmitter, symbols in the form of a succession of pulses.

Such a succession of radio pulses forms a signal sometimes referred to as IR (Impulse Radio) signal. Each pulse of the signal has a duration varying, for example, between a few hundreds of picoseconds and a few nanoseconds. Several pulses are generally used for transmitting the same symbol, a fact which allows a very appreciable repetition gain to be obtained. The succession of pulses thus represents a predetermined sequence of digital values corresponding to the symbol to be transmitted. For example, each pulse in the succession of pulses can represent a digital value, typically a binary element, of the sequence. Other types of representation are of course equally possible.

The moment in time of transmission of the pulses is not necessarily regular: use may indeed be made of a pseudo-random time hopping code, according to a technique referred to as "Time Hopping", whose components correspond to possible transmission times. By way of example, if each pulse can be transmitted over 32 different locations, the hopping code will be of order 32. The N-th pulse from a succession of pulses corresponding to a symbol, with N>1, will be transmitted on the time location designated by the N-th element of the hopping code. Thus, it may be said that the time hopping principle is, in the time dimension, the exact counterpart of frequency hopping (FH) in the spectrum. In this way, several transmissions may be multiplexed onto the same radio channel.

Furthermore, the information transmitted in the form of a succession of radio pulses can be modulated in various different ways, in a manner known per se. Modulation of the PPM (Pulse Position Modulation) type, in which each pulse may, or may not, be shifted in the time dimension depending on the value of the symbol to be transmitted, and modulation of the OOK (On/Off Keying) type, in which the transmission of each pulse is enabled or, conversely, disabled depending on the value of the symbol to be transmitted, will for example be mentioned. Other types of modulation are of course equally usable.

Figure 1:
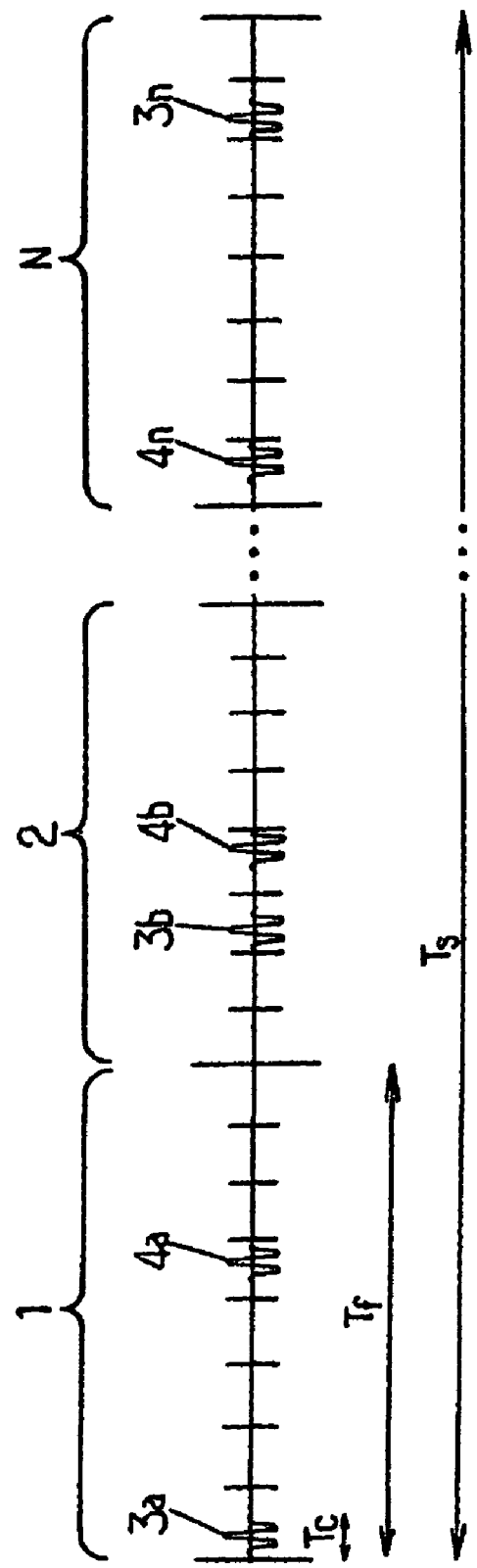
FIG. 1 is a diagram showing a simplified example of transmission of symbols in the form of pulses.

In order to illustrate the above, FIG. 1 shows an example of transmission of symbols in the form of a succession of N pulses of short duration. In this example, time hopping is used and the transmitted signal is modulated using PPM.

In this example, two symbols are in fact transmitted by one transmitter for the attention of two different receivers. These symbols are time multiplexed by means of the aforementioned time hopping technique.

The first symbol is transmitted in the form of a first succession of N pulses denoted 3*a*, 3*b*, . . . , 3*n*. The pulse 3*a* occupies the first time slot of duration 2Tc (for example a few hundreds of picoseconds to a few nanoseconds) from amongst the eight available slots of the first time interval 1 of duration Tf (in other words such that Tf=8×2Tc=16Tc); the pulse 3*b* occupies the third time slot of duration 2Tc from amongst the eight available slots of the second time interval 2 of duration Tf, . . . , and the pulse 3*n* occupies the seventh time slot of duration 2Tc from amongst the eight available slots of the last time interval N of duration Tf. In other words, the first symbol is transmitted according to a pseudo-random time hopping code of order eight; 1, 3, . . . , 7.

Similarly, the second symbol is transmitted in the form of a second succession of N pulses denoted 4*a*, 4*b*, . . . , 4*n*. The pulse 4*a* occupies the fifth time slot of duration 2Tc (for example a few hundreds of picoseconds to a few nanoseconds) from amongst the eight available slots of the first time interval 1 of duration Tf; the pulse 4*b* occupies the fourth time slot of duration 2Tc from amongst the eight available slots of the second time interval 2 of duration Tf, . . . , and the pulse 4*n* occupies the first time slot of duration 2Tc from amongst the eight available slots of the last time interval N of duration Tf. In other words, the first symbol is transmitted according to a pseudo-random time hopping code of order eight; 5, 4, . . . , 1.

Each symbol is therefore transmitted after a maximum period of time Ts=N.Tf.

Furthermore, in the example illustrated in FIG. 1, each time slot is divided into two portions each of duration Tc and each pulse is transmitted over a single portion of a time slot. This is explained by the fact that the symbols are transmitted by means of PPM modulation. Each digital value forming the symbol to be transmitted thus determines the position of the corresponding pulse or pulses within the respective time slots.

Thus, in the example illustrated, it has been considered that all of the digital values forming the first symbol were 0s, whereas all of the digital values forming the second symbol were 1s. Consequently, all of the pulses 3*a*, 3*b*, . . . , 3*n* are positioned in the first half of the respective time slots and, conversely, all of the pulses 4*a*, 4*b*, . . . , 4*n* relating to the second symbol are positioned in the second half of the respective time slots.

It goes without saying that other types of transmission are equally possible. For example, if OOK modulation had been implemented in place of the PPM, the pulses 4*a*, 4*b*, . . . , 4*n* would have been transmitted, whereas the pulses 3*a*, 3*b*, . . . , 3*n* would not have been.

In the following part of the description, the reception of the symbols transmitted according to the above principles will be considered.

An acquisition and synchronization phase is first of all implemented in the receiver, taking advantage of a prior knowledge of the time hopping sequence. The receiver identifies this sequence, positions its start time and extracts from this the desired time reference, in a manner known per se.

Starting from this moment in time, the receiver has detected then locked onto a propagation path (the radio propagation channel being able to have multiple paths). It is henceforth capable of precisely predicting the arrival times of the transmitted pulses.

The receiver then examines each of these pulse arrival times in order to detect the effective absence or presence of a pulse at each of these times. This examination advantageously comprises a comparison of the amplitude of the received signal with a decision threshold. This is notably the case when the receiver in question is of the non-coherent type.

It should be noted that, in other cases, the detection of the pulses may be carried out by other means. For example, for receivers with coherent detection or detection by correlation, the detection of the pulses is advantageously a synchronous detection known per se.

A decision can then be made by the receiver with regard to the value of the received symbols, this decision taking into account the detection of the pulses initially carried out.

Figure 2:
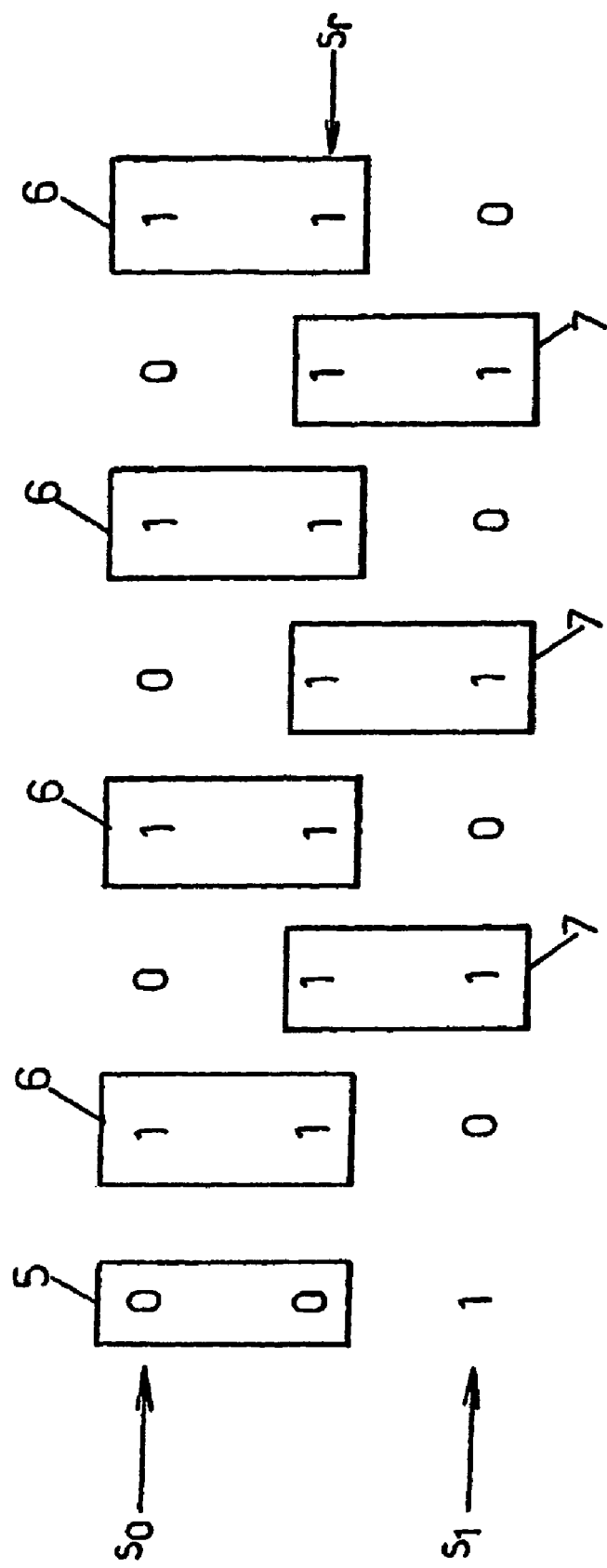
FIG. 2 is a diagram showing examples of digital chains taken into account in order to decide on a received symbol.

In order to illustrate the decision making process according to the present invention, for simplification, it is hereinafter considered that only two symbols can be transmitted for the attention of the receiver. As illustrated in FIG. 2, the first symbol $S_0$ (for example equal to "0") is coded according to the word of eight binary elements 01010101, whereas the second symbol $S_1$ (for example equal to "1") is coded according to the word of eight binary elements 10101010, each binary element being the object of a respective radio pulse when it is transmitted, according to the principles described above.

Thus, in the chosen example, each of the symbols $S_0$ and $S_1$ comprises a number equal to 0 and 1, in other words four 0s and four 1s each. The 0s and the 1s therefore have the same nominal weight within each of said symbols, namely four each.

In addition, the assumption here is that these symbols are transmitted using a modulation of the OOK type. The transmission of each of the symbols $S_0$ and $S_1$ therefore consists in the transmission of four pulses (binary elements at 1) alternating with the absence of transmission of four other pulses (binary elements at 0). It is thus understood that each of the symbols $S_0$ and $S_1$ possesses the same energy.

Conventionally, the decision on the symbol transmitted can be made at the receiver, by comparing the energy received within windows of observation substantially corresponding to the duration of a pulse (Tc) with a detection threshold, so as to determine the sequence of binary elements received, then by comparing the sequence determined with the representation of the various symbols. In an ideal situation where the detection threshold is perfectly positioned, a symbol-time (Ts) would be characterized by the fact that, according to the example presented above, a pulse would be detected in 50% of the windows, whereas no pulse would be detected in the remaining 50%.

A maladapted detection threshold would cause either false alarms (pulses detected even though the corresponding binary elements are at 0), or missed detections (no pulses detected even though the corresponding binary elements are at 1).

A maladapted threshold, either permanently owing to an incorrect initial adjustment or temporarily for example due to variations in the radio conditions, in the example described, will result in an imbalance between the number of binary elements at 0 and the number of binary elements at 1 detected. Indeed, since the symbols $S_0$ and $S_1$ possess as many 0s as 1s, these binary elements should appear in the same proportion within the sequence determined at the receiver. It is thus understood that the maladaptation of the threshold biases the detection of the binary elements forming each transmitted symbol and therefore leads to a poor performance of the receiver in the determination of the transmitted symbol.

According to the invention, the imbalance created, in other words the change in weight of each of the binary elements within the sequence determined, is compensated within the receiver. This is achieved by the latter restoring the nominal weights of the binary elements in order to improve the process for making a decision on the value of the transmitted symbol. In this way, a relevant decision will be able to be taken on the value of the transmitted symbol even if the detection threshold is wrongly chosen or maladapted.

This compensation mechanism is illustrated hereinafter in an example described with reference to FIG. 2. This figure recalls the representation, in binary elements, of each symbol $S_0$ and $S_1$ able to be transmitted.

The sequence $S_r$ represents a succession of eight binary elements received and detected by the receiver in question, following the transmission of a symbol ($S_0$ or $S_1$) by a transmitter. This sequence $S_r$, namely 01111111, can be compared with each of the symbols $S_0$ and $S_1$. It is observed that $S_r$ comprises a 0 in common (reference 5) and four 1s in common (references 6) with $S_0$. Furthermore, $S_r$ comprises three 1s in common (references 7) and no 0s in common with $S_1$.

According to the invention, the receiver applies a weighting relating to each of the binary elements 0 and 1 represented in the sequence $S_r$, in such a manner as to restore the nominal weights of these binary elements 0 and 1, in other words their proportion within the symbols $S_0$ and $S_1$.

In the present example, the sequence $S_r$ comprises only one 0 for seven 1s. In other words, the weights of the 0s and of the 1s within the sequence $S_r$ are respectively 1 and 7, against a nominal weight of 4 for each of them within the symbols $S_0$ and $S_1$. The weighting for restoring the nominal weights may for example be achieved by multiplying, when the decision is made, the weights of the 0s and of the 1s by respective coefficients $p_0$ and $p_1$, such that $p_0 = 7 \times p_1 = 4$.

According to one example of a decision made on the basis of the sequence $S_r$ determined at the receiver, a correlation of $S_r$ with $S_0$ and a correlation of $S_r$ with $S_1$ are calculated, each correlation taking the above-mentioned weighting into account.

Thus, one example of correlation of $S_r$ with $S_0$ may be calculated as follows: $C_0 = 1 \times p_0 + 4 \times p_1$, since $S_r$ has one 0 and four 1s in common with $S_0$. Thus, by injecting the values of the above-mentioned weighting coefficients $p_0$ and $p_1$, the following is found: $C_0 = 4 + 4 \times 4/7 = 44/7$. Similarly, the correlation of $S_r$ with $S_1$ may be calculated as follows: $C_1 = 3 \times p_1$, since $S_r$ has three 1s only in common with $S_1$. After calculation, the following is found: $C_1 = 3 \times 4/7 = 12/7$.

In this example, $C_0$ has a value almost four times higher than that of $C_1$. It can therefore be decided, with a relatively high degree of certainty, that the received sequence $S_r$ corresponds to a symbol $S_0$.

It should be noted that, according to the same example and in the absence of weighting, the correlations $C'_0$ and $C'_1$ of $S_r$ with $S_0$ and $S_1$, respectively, would have had for respective values: 5 and 3. It could therefore have been decided that the received symbol corresponded to $S_0$ even without restoring the nominal weights of the 0s and of the 1s. However, this decision would have been less certain, since, in this case, $C'_0$ has a value less than twice as high as that of $C'_1$.

It could also be shown that, in other examples, the correct decision would be made under the principles of the invention described hereinabove, but an incorrect one according to a conventional decision mechanism, in other words in the absence of weighting of the various digital values in play.

In the example described hereinabove, the preponderance of the 1s with respect to the 0s in the sequence $S_r$, whereas each of the symbol $S_0$ and $S_1$ comprised four 0s and four 1s, means that the detection threshold of the pulses was too low. As a result, the binary element of $S_r$ detected at 0 is more reliable than the binary elements of $S_r$ detected at 1 some of which are necessarily erroneous. The weighting described above thus allows the decision to be rendered more reliable, by re-assigning to the binary elements 0 and 1 their nominal weights. This also allows the incorrectly positioned detection threshold to be compensated, without having to modify it.

The weighting can be updated for each new symbol received, or potentially in a less regular manner.

It will be understood that the decision mode described hereinabove constitutes a simple example. It goes without saying that the weighting of the digital values of a sequence may also be implemented in any other decision-making algorithm. Similarly, the type of modulation used can influence the way the digital values are weighted in order to restore their nominal weights.

Furthermore, it will be noted that, in the example described with reference to FIG. 2, the symbols able to be transmitted each comprised the same number of 0s and 1s. The weightings resulting from this therefore aimed to restore the balance between the 0s and the 1s. However, it will be understood that, even in the case of a non-uniform distribution of the digital values within the symbols able to be transmitted (for example, 40% of 0s and 60% of 1s), the weighting chosen will need to allow the nominal weights for each digital value of the sequence determined (in other words, for example, 40% of 0s and 60% of 1s) to be restored.

The operations described hereinabove are implemented within a receiver. Advantageously, at least some of them are carried out by means of a computer program comprising appropriate instructions, the computer program being loadable and executable on a receiver.

The operations described hereinabove could, if required, be implemented by a detection device, which can take the form of a hardware or software module and which can be integrated into a receiver.

As a variant, the operations may be implemented by a programmable component, such as a DSP (Digital Signal Processor) for example, which can be integrated into a receiver.

One important advantage of the present invention is that the performance specifications of the receiver in terms of detection of symbols are conserved, even when the radio conditions have varied during a communication. In addition, the digital compensation, represented by the weighting of the digital values, does not require modification of the receivers in terms of hardware. From a software perspective, the digital operations to be implemented are relatively light. Lastly, this improvement of the decision at the receiver does not affect the transmission.

As indicated above, the present invention is especially advantageous in the case of non-coherent receivers, in which the optimal positioning of the detection threshold is particularly critical. However, it is also applicable to any other type of receivers, such as receivers with coherent detection or detection by correlation.

The invention claimed is:

1. A method for detection of symbols by a receiver, each symbol being transmitted from a transmitter in the form of a succession of pulses representing a predetermined sequence of sent digital values, the sent digital values having respective nominal distributions within each predetermined sequence, the method comprising:

receiving, at the receiver, a succession of pulses substantially corresponding to a symbol transmitted from the transmitter;

determining a sequence of received digital values corresponding to said received succession of pulses, said received digital values having respective distributions within the determined sequence; and deciding on the symbol received as a function of the determined sequence of received digital values, the decision comprising a weighting of the received digital values of the determined sequence, the weighting chosen so as to restore the respective distributions of the received digital values to the respective nominal distributions of said sent digital values.

2. The method as claimed in claim 1, in which said succession of pulses substantially corresponding to a symbol transmitted from the transmitter is transmitted according to a pseudo-random sequence of time hops.

3. The method as claimed in claim 1, in which said succession of pulses substantially corresponding to a symbol transmitted from the transmitter is modulated by time shifting of the pulses.

4. The method as claimed in claim 1, in which said succession of pulses substantially corresponding to a symbol transmitted from the transmitter is modulated by enabling or disabling the transmission of the pulses.

5. The method as claimed in claim 1, in which each pulse from said succession of pulses substantially corresponding to a symbol transmitted from the transmitter has a duration in the range between a few hundreds of picoseconds and a few nanoseconds.

6. The method as claimed in claim 1, in which the transmitter and the receiver use an ultra-wide-band radio communications technology.

7. The method as claimed in claim 1, in which the determination of the sequence of received digital values corresponding to said received succession of pulses comprises a comparison of the energy of each pulse from the received succession of pulses with at least one given threshold.

8. The method as claimed in claim 1, in which the decision on the symbol received comprises the calculation of a correlation of the determined sequence of received digital values with each of the symbols able to be transmitted from the transmitter, and the determination of the symbol corresponding to the best correlation, and in which the correlation calculation comprises a counting operation of the common digital values between the determined sequence of received digital values and each of the symbols able to be transmitted from the transmitter, said counting operation also applying respective weighting coefficients for the received digital values, in such a manner as to restore the respective distributions of the received digital values to the respective nominal distributions of said sent digital values.

9. A receiver designed for detecting symbols, each symbol being transmitted from a transmitter in the form of a succession of pulses representing a predetermined sequence of sent digital values, the sent digital values having respective nominal distributions within each predetermined sequence, the receiver comprising:

means for receiving a succession of pulses substantially corresponding to a symbol transmitted from the transmitter;

means for determining a sequence of received digital values corresponding to said received succession of pulses, said received digital values having respective distributions within the determined sequence; and means for deciding on the symbol received as a function of the determined sequence of received digital values, said means for deciding on the symbol received comprising means for weighting of the received digital values of the determined sequence, so as to restore the respective distributions of the received digital values to the respective nominal distributions of said sent digital values.

10. A computer program product for detection of symbols by a receiver, each symbol being transmitted from a transmitter in the form of a succession of pulses representing a predetermined sequence of sent digital values, the sent digital values having respective nominal distributions within each predetermined sequence, the computer program product comprising a non-transitory computer readable medium, having stored thereon a computer program comprising program instructions, the computer program being loadable into a data-processing unit of the receiver and adapted to cause the data-processing unit to carry out:

receiving, at the receiver, a succession of pulses substantially corresponding to a symbol transmitted from the transmitter;

determining a sequence of received digital values corresponding to said received succession of pulses, said received digital values having respective distributions within the determined sequence; and deciding on the symbol received as a function of the determined sequence of received digital values, the decision comprising a weighting of the received digital values of the determined sequence, the weighting chosen so as to restore the respective distributions of the received digital values to the respective nominal distributions of said sent digital values.

11. A device for detection of symbols, each symbol being transmitted from a transmitter in the form of a succession of pulses representing a predetermined sequence of sent digital values, the sent digital values having respective nominal distributions within each predetermined sequence, the detection device comprising:

means for obtaining a succession of pulses substantially corresponding to a symbol transmitted from the transmitter;

means for determining a sequence of received digital values corresponding to said received succession of pulses, said received digital values having respective distributions within the determined sequence; and means for deciding on the symbol received as a function of the determined sequence of received digital values, said means for deciding on the symbol received comprising means for weighting of the received digital values of the determined sequence, so as to restore the respective distributions of the received digital values to the respective nominal distributions of said sent digital values.

12. A programmable component for detecting symbols, each symbol being transmitted from a transmitter in the form of a succession of pulses representing a predetermined sequence of sent digital values, the sent digital values having respective nominal distributions within each predetermined sequence, the programmable component comprising:

means for obtaining a succession of pulses substantially corresponding to a symbol transmitted from the transmitter;

means for determining a sequence of received digital values corresponding to said received succession of pulses, said received digital values having respective distributions within the determined sequence; and means for deciding on the symbol received as a function of the determined sequence of received digital values, said means for deciding on the symbol received comprising means for weighting of the received digital values of the determined sequence, so as to restore the respective distributions of the received digital values to the respective nominal distributions of said sent digital values.

* * * * *